United States Patent [19]

King et al.

[11] 3,769,150

[45] Oct. 30, 1973

[54] AROMATIC POLYSULPHONE COATED ARTICLE AND BONDED STRUCTURE

[75] Inventors: Terence King, New Barnet; John Brewster Rose, Letchworth, both of England

[73] Assignee: Imperial Chemical Industries Limited, London, England

[22] Filed: June 8, 1971

[21] Appl. No.: 150,905

[30] Foreign Application Priority Data
June 19, 1970 Great Britain.................... 29,907/70
July 15, 1970 Great Britain.................... 34,317/70
Feb. 5, 1971 Great Britain...................... 4,033/71

[52] U.S. Cl............ 161/182, 117/122 H, 260/47 R, 260/79.3 R
[51] Int. Cl............................ B32b 9/04, C09j 7/02
[58] Field of Search .................... 117/122 P, 122 H, 117/122 PF; 161/167, 182; 156/327; 260/47 R, 79.3 R

[56] References Cited
UNITED STATES PATENTS
3,471,587   10/1969   Whittemore et al............ 117/132 X FOREIGN PATENTS OR APPLICATIONS
1,060,546   4/1964   Great Britain
1,153,035   9/1966   Great Britain Primary Examiner—William D. Martin
Assistant Examiner—Bernard D. Pianalto
Attorney—Cushman, Darby & Cushman

[57] ABSTRACT

A solid surface is coated with, or bonded to another surface by means of, an adhesive composition comprising an aromatic polysulphone which has a reduced viscosity of at least 0.3 and which contains at least 0.2 (desirably 0.5 to 3.5) hydroxyl groups per 100 polymer repeat units.

6 Claims, No Drawings

AROMATIC POLYSULPHONE COATED ARTICLE AND BONDED STRUCTURE

This invention relates to aromatic polysulphone adhesive compositions.

It is stated in British Specification No. 1,016,245 that polymeric materials comprising repeating units having the structure —Ar—SO$_2$— show good adhesion to surfaces of glass and metals and may be used as high-temperature thermoplastic adhesives. In this structural formula Ar is a divalent aromatic residue which may vary from unit to unit in the polymer chain and in at least some of the units Ar has the structure I

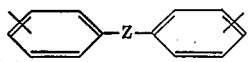

(where Z is an oxygen or sulphur atom or the residue of a 4,4'-bisphenol, i.e., the divalent structure obtained by removing the two hydroxyl hydrogen atoms) and in any other units Ar is a residue of benzene, diphenyl, or a polynuclear aromatic hydrocarbon containing not more than two aromatic nuclei, so that in the divalent aromatic residues containing two benzene rings each benzene ring bears one of the valencies, and one or more of the aromatically bound hydrogen atoms in any of the divalent aromatic residues may be replaced by halogen atoms or alkyl or alkoxy groups containing from one to four carbon atoms. It is said that the polymers may be blended with other polymeric materials and may contain any other suitable ingredients such as fillers. One of the polymers particularly described in British Specification No. 1,016,245 contains units having the structure

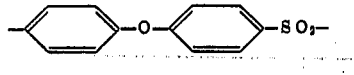

It is stated also in British Specification No. 1,060,546 that thermoplastic polymers consisting essentially of reeating units of the formula +L-A+ can be used as adhesives or coatings. In this structural formula A represents an aromatic group, and in from 10 percent to 50 percent of the units L represents the linkage —O— and in the other units L represents the linkage —SO$_2$—, each aromatic group A being connected to no more than one linkage L represented by the linkage —O—. One of the polymers particularly described in British Specification 1,060,546 is said to contain repeating units of the formula

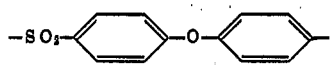

It is stated also in British Specification No. 1,136,766 that thermoplastic polyarylene polyethers composed of recurring units having the formula +O — E — O — E'+ are virtually universally adherent and that structural elements may utilise such polymers in structural and/or bonding capacities. In this structural formula E is the residuum of a dihydric phenol and E' is the residuum of a benzenoid compound having an inert electron-withdrawing group in at least one of the positions ortho and para to the valance bonds, and both of said residua are valently bonded to the ether oxygens through aromatic carbon atoms. The polymer is said to be conveniently made by the reaction of an alkali metal double salt of dihydric phenol and a dihalobenzenoid compound having the electron-withdrawing group. Of the polymer specifically described as bonding agents in British Specification No. 1,136,766 one is said to be composed of recurring units having the formula

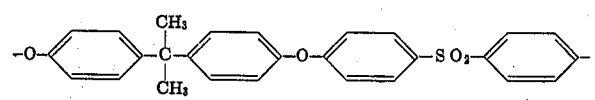

and another to have units of the formula

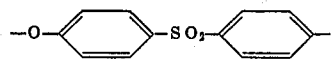

It is said that the polymers are of high molecular weight indicated by a reduced viscosity which is preferably above about 0.4.

Thermoplastic polymers of this type may also be made by the processes described in British Specification Nos. 1,153,035 and 1,177,183. The disclosure of all the aforesaid five specifications is incorporated herein by reference.

Blends of such thermoplastic polysulphones with various other polymeric materials are said to be useful as adhesives in the following patent specifications:

| Other polymeric material | Patent Specification |
|---|---|
| aromatic polycarbonate | British 1,140,961 |
| organopolysiloxane | do. |
| polyacrylate | do. |
| CH$_2$ CF$_2$/C$_3$F$_6$ copolymer | do. |
| aromatic polyhydroxyethers | British 1,141,030 |
| fluoroaliphatic-substituted polyphenylene oxides | U.S. 3,471,587 |
| α-olefin/acrylonitrile copolymers | British 1,221,083 |
| nitrile rubbers | Dutch 68 08868 |
| siloxane/polysulphone) | Dutch 69 04310 |
| block copolymers) | German 1,927,787 |

The "aromatic polyhydroxyethers" are thermoplastic condensation products of dihydric phenols and bifunctional epoxides, e.g., an epihalohydrin or a diepoxide.

According to British Specification 1,169,613 various sulphone resins, including polyhydroxy polyether polysulphones (obtained from a dihydric phenol and a diglycidyl ether of a dihydric phenol, one or both phenols having two aryl groups linked by a sulphone group) as well as the thermoplastic polysulphones described above, can be incorporated into hardenable epoxide resins (i.e., epoxide resins containing a hardening agent) to be used as adhesives. The compositions may contain fillers such as asbestos, glass, boron or carbon fibers or powdered metals, especially aluminium. The thermoplastic polysulphone in these compositions is said to act as a thickening agent, reducing the amount of epoxide resin that escapes from the area to be bonded when pressure is applied. Preferred polysulphones for use in the compositions are said to be those wherein the repeating unit contains ether groups but is free from pendent hydroxyl groups. Similar compositions containing in addition a copolymer of ethylene and α-olefinic ester (e.g., alkyl acrylate or methacrylate, vinylacetate) are described in German Specification 1,935,115.

Blends of certain aromatic polysulphones with other polymers are also described in the following patent specifications:

| Other polymeric material | Patent Specification |
|---|---|
| polyolefin | U.S. 3,472,810 |
| polyphenylene oxide | British 1,180,847 |
| thermosetting resins | French 1,579,310 |
| ABS | British 1,196,066 |
| polyvinyl chloride | British 1,209,718 |
| polymethylmethacrylate | German 1,944,044 |

It has now been found that the adherence of a thermoplastic polymer of the above-described type is not only dependent on its molecular weight but also is affected strongly by the nature of the predominant end-groups of the polymer chain. Polysulphones having predominantly phenolic (—OH) end-groups have greatly enhanced adhesive properties.

According to the present invention, a solid surface is coated with, or bonded to another surface by means of, an adhesive composition comprising an aromatic polysulphone whose number-average molecular weight is sufficiently high to give a reduced viscosity of at least 0.3 (measured at 25°C on a solution in dimethyl formamide containing 1 g of the polysulphone in 100 cm³ of solution) and which contains at least 0.2 aromatically bound hydroxyl groups per 100 polymer repeat units. The number of aromatically bound hydroxyl groups per 100 polymer repeat units contained by the aromatic polysulphone is preferably more than 0.5 (desirably more than 1.0) and desirably not more than 3.5 (preferably not more than 3.0).

Aromatic polysulphones having hydroxyl end-groups may be prepared from the products described in British Specification Nos. 1,153,035 and 1,177,183 by acidification of the anionic oxygen end-groups. Alternatively, an aromatic polysulphone with a preponderance of hydroxyl end-groups may be obtained by the reaction of a dihydric phenol (or its alkali metal double salt) with a dihalobenzenoid compound as described and claimed in British Specification No. 1,136,766 (or more fully in British Specification Nos. 1,078,234 and 1,133,561) provided that the alkali metal double salt of the dihydric phenol is present in excess and the polymerisation reaction is followed by acidification. The desired polysulphone may also be obtained from the self-condensation of an alkali metal salt of a halogenophenylsulphonyl phenol as described and claimed in British Specification Nos. 1,153,035 and 1,177,183 in the presence of a minor amount of an alkali metal double salt of a dihydric phenol, followed by acidification. Preferred are those polymers having predominantly hydroxyl end-groups and based on the repeat unit having the formula I or II either alone or in combination with each other and/or with up to 80 percent of units having the formula III,

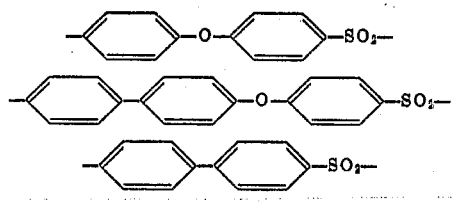

or based on the repeat unit having the formula IV

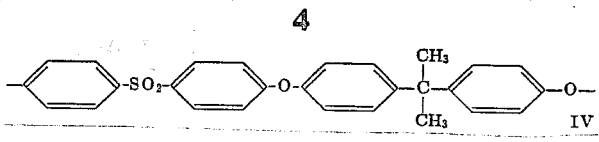

in which formulae the hydrogen atoms of the aromatic rings may optionally be substituted by inert atoms or groups.

The hydroxy-containing aromatic polysulphone may be applied to the solid surface in any of the customary ways for applying adhesives. For example it may be applied as a solution or suspension, by brushing, impregnating, dipping or spraying; by laminating a film of the polymer to the surface; or by any other suitable technique, such as for example (i) coating by melt extrusion of the polymer, (ii) powder coating, or (iii) fluidized bed coating of a preheated solid surface. By the variety of coating techniques that may be used it is evident that surfaces of almost any shape and size can be coated.

The process of bonding surfaces together should be carried out at a temperature sufficiently high and with sufficient pressure between the surfaces to allow the aromatic polysulphone to flow. Butt or lap joints may be prepared, for example, by heating the surfaces above the softening point of the polymer, inserting a film of the aromatic polysulphone between the surfaces and pressing the two interleaved surfaces together and allowing the bond to cool after optional further heating. Alternatively, the surfaces may be interleaved with polysulphone film whilst at ambient temperatures followed by pressing and heating. A similar process of pressing and heating may be used where the surfaces have been coated with polysulphone as hereinbefore described.

Solid surfaces according to the invention may be bonded together to form a two-ply laminate and any required number of such laminates may be similarly bonded together to form a multi-layer laminate having similar or dissimilar layers. The solid surfaces which are coated with and may be bonded together by a hydroxyl-containing aromatic polysulphone are preferably those which are "wetted" by the aromatic polysulphone. Such surfaces include metals, vitreous surfaces and naturally occurring and synthetic resins; and the surfaces may be in the form of sheet, film, mouldings, powder, extrudate, and fibre. Metals that may be bonded include particularly steel, stainless steel, titanium steel, titanium and aluminium; vitreous surfaces include in particular glass, ceramic and enamelled materials; resins include in particular, polyesters, polyolefines, polysulphones, polyimides and polyamides as well as carbon fibres and cellulosic materials such as wood and wood products. A comprehensive list of adherents for polysulphone adhesives is given in the aforesaid British Specification No. 1,136,766. A further feature of the adhesive bonds so formed is their resistance to high temperature so that, unlike many thermoplastic adhesives, prolonged usage at high temperatures (for example, greater than 200°C) may be facilitated.

The hydroxyl-containing aromatic polysulphone may be blended with other polymeric materials, for example any of those mentioned in the above-mentioned patent specifications relating to blends of polysulphones with various other polymeric materials. The hydroxyl-containing aromatic polysulphone may also contain any desired fillers, for example asbestos, glass, boron or carbon fibres or powdered metals.

An important feature of the aromatic polysulphones to be used in coating or bonding solid surfaces according to the invention is that the polymers should contain at least 0.2 hydroxyl groups per 100 polymer repeat units. The number of hydroxyl groups present in the polymer may be obtained for example by chemical means or from nuclear magnetic resonance data.

The invention is illustrated by the following examples.

EXAMPLE 1

The potassium salt of 4-(4-fluorophenylsulphonyl)-phenol (100 g; 0.344 mole), the anhydrous dipotassium salt of bis-(4-hydroxyphenyl) sulphone (bisphenol S) (0.68 g; 0.00207 mole) and redistilled 1,1-dioxothiolan (sulpholane) (150 g) were stirred together under nitrogen to produce a polymer of the structure

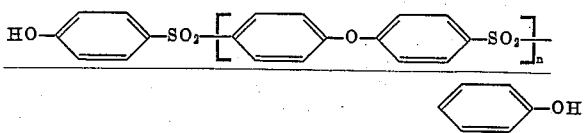

During the preparation of the polymer, portions of the reaction mixture were removed from time to time and allowed to cool to give polymers of lower and intermediate molecular weight. The residue, which had then been heated for 22 hours, was then also cooled. The soft granular solids thus obtained were macerated with water and then treated twice with boiling water containing about 1% v/v acetic acid to give the polymers with hydroxyl end-groups. Another polymerisation was carried out similarly, except that such extracted portion and the residual reaction mixture were treated at 150°C for 1 hour with methyl chloride to give, after extraction and drying, corresponding polymers with methoxyl end-groups. The hydroxyl-ended polymer of highest molecular weight was found to have a reduced viscosity of 0.50 as measured at 25°C on a solution in dimethylformamide containing 1 g of polymer in 100 cm³ of solution and to contain 2.5 hydroxyl groups per 100 polymer repeat units, and the corresponding "methoxyl end-group" polymer was found to have a reduced viscosity of 0.55 and to contain 0.06 hydroxyl groups per 100 polymer repeat units.

The hydroxyl end-group and the methoxyl end-group polymers from the residual reaction mixture were compression-moulded at 300°C to produce clear tough films approximately 0.25 mm thick. The films were cut into pieces (25 mm × 12.5 mm) which were degreased by soaking in detergent for 18 hours, washed with distilled water and dried in vacuo at 140°C. Pieces (100 mm × 25 mm × 0.9 mm thick) of 18/8 w/w chromium/-nickel stainless steel (according to British Standard 1501-821; 1958) were surface-cleaned using steel wool and an abrasive cleaner and the edges were filed down. The pieces were degreased in trichloroethylene vapour. Lap joints were prepared by sandwiching a piece of the aromatic polysulphone film between two stainless steel plates which overlapped by 12.5 mm. The assembly was held in position by a binder clip and the joint made by heating the assembly in an oven for 30 minutes at a temperature initially of 340°C, then 370°C after 15 minutes, and finally 380°C. The joint was cooled to room temperature and excess polysulphone removed.

The shear strengths of the lap joints were determined using a Davenport tensile test machine which has a shear rate of 12.5 mm/minute. Five joints fabricated from the aromatic polysulphone having 2.5 hydroxyl groups per 100 polymer repeat units were found to have tensile shear strengths of 1,156; 1,242; 1,115; 1,219; 1,184 kg (average = 1,184 kg). Five joints fabricated from the aromatic polysulphone having methoxyl end-groups had tensile shear strengths of 884; 559; 695; 515; 876 kg (average = 707 kg).

The shear strengths of the lap joints were examined further at higher temperatures and after ageing to show the advantage of the hydroxyl end-group aromatic polysulphone over the methoxyl end-group polymer.

|  | Hydroxyl end-group | Methoxyl end-group |
|---|---|---|
| Shear strength at 150°C | 814 kg | 560 kg |
| Shear strength at 220°C | 448 kg | — |
| Shear strength at 150°C after 1000 hours at 150°C | 667 kg | 400 kg |

Similar joints were prepared in the form of a multilayer laminate.

To determine the number of hydroxyl groups in the aromatic polysulphone, a portion of the reaction mixture was extracted and methylated and the resulting polymer worked up. The reduced viscosity of each polymer was determined and checked that it was consistent with that of the unmethylated sample. The number of methoxyl groups thus formed was then determined by nuclear magnetic resonance spectroscopy in terms of methoxyl protons to aromatic ring protons. For the polymer chain of the structure

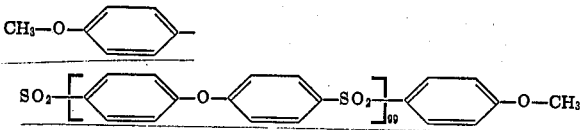

containing 100 repeat units, this ratio is 6 methoxyl protons to 800 aromatic ring protons; hence the number of methoxyl groups per 100 repeat units is given directly by the n.m.r. measurements. The number of methoxyl-groups per 100 polymer repeat units in the methylated portion is the same as the number of hydroxyl-groups per 100 polymer repeat units in the original unmethylated polymer. Such a procedure is generally satisfactory for determining the hydroxyl-group concentration of any aromatic polysulphone where the relative proportions of methoxyl protons and protons characteristic of the polymer repeat units can be obtained by n.m.r. spectroscopy.

EXAMPLE 2

Lap joints were prepared by the method of Example 1 but using stainless-steel pieces 1.6 μm thick and a polysulphone supplied by Union Carbide Corporation as "Polysulfone" P3500 said to have repeating units of the formula

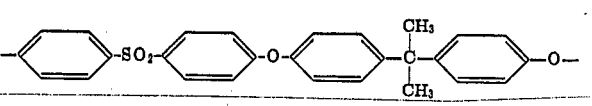

Two samples of polysulphone were obtained, both having a reduced viscosity of 0.41, but one sample contained 0.9 hydroxyl end-groups per 100 repeat units and the other sample contained 0.1 hydroxyl end-groups per 100 repeat units, as determined by an n.m.r. method similar to that described in Example 1.

The shear strengths of joints fabricated from the polysulphone having 0.9 hydroxyl end-groups per 100 repeat units were 523; 626; 550; 509 kg (average = 552 kg) whilst those from the sample having 0.1 hydroxyl end-groups per 100 repeat units were 488; 302; 247; 103 kg (average = 285 kg).

We claim:

1. A solid surface coated with an adhesive composition comprising an aromatic polysulphone whose number average molecular weight is sufficiently high to give a reduced viscosity of at least 0.3 (measured at 25°C on a solution in dimethyl formamide containing 1 g of polymer in 100 cm³ of solution) and which contains at least 0.2 aromatically bound hydroxyl end-groups per 100 polymer repeat units, said coating being characterized by its increased adhesion to said surface as evidenced by increased shear strength compared with the case where said coating contains a similar polysulphone with less than the indicated number of aromatically bound hydroxyl groups.

2. A coated solid surface according to claim 1 in which the aromatic polysulphone contains 0.5 to 3.5 aromatically bound hydroxyl groups per 100 polymer repeat units.

3. A coated solid surface according to claim 1 in which the aromatic polysulphone has a reduced viscosity of at least 0.4.

4. A coated solid surface according to claim 1 in which the aromatic polysulphone consists essentially of repeating units having the formula I or II, alone or in combination with each other and up to 80 percent of units having formula III

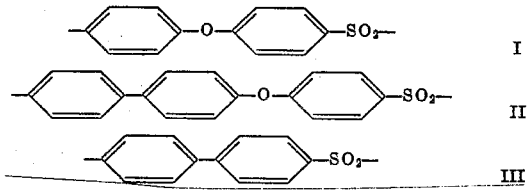

5. A coated solid surface according to claim 1 in which the aromatic polysulphone consists essentially of repeating units having the formula

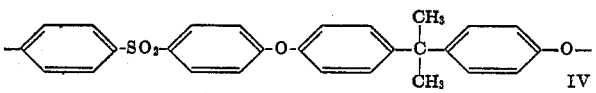

6. A bonded structure comprising the coated solid surface of claim 1 bonded to another surface.

* * * * *